United States Patent
Seah et al.

(10) Patent No.: US 10,162,821 B2
(45) Date of Patent: Dec. 25, 2018

(54) COMMON DATA PROCESSING DEFINITION ACROSS MULTIPLE DATA PROCESSING NODES

(71) Applicant: SAP SE, Walldorf (DE)

(72) Inventors: Vei Ming Seah, Cupertino, CA (US); Barbara Stortz, San Jose, CA (US)

(73) Assignee: SAP SE, Walldorf (DE)

( * ) Notice: Subject to any disclaimer, the term of this patent is extended or adjusted under 35 U.S.C. 154(b) by 426 days.

(21) Appl. No.: 15/140,223

(22) Filed: Apr. 27, 2016

(65) Prior Publication Data

US 2017/0315995 A1   Nov. 2, 2017

(51) Int. Cl.
G06F 17/30 (2006.01)
H04L 29/08 (2006.01)
H04L 29/06 (2006.01)

(52) U.S. Cl.
CPC .. *G06F 17/30011* (2013.01); *G06F 17/30867* (2013.01); *H04L 63/08* (2013.01); *H04L 67/1097* (2013.01)

(58) Field of Classification Search
None
See application file for complete search history.

(56) References Cited

U.S. PATENT DOCUMENTS 8,917,744 B2 * 12/2014 Childress ............. G06F 9/5011
370/465
2009/0327495 A1 * 12/2009 Betts-LaCroix ........ H04L 67/10
709/226

OTHER PUBLICATIONS

Flowgraphs, The Best-Run Businesses Run SAP, Technology Platform, SAP HANA Platform, SAP HANA Platform Core SPS 11, Created on Apr. 21, 2016. Retrieved from http://help.sap.com/saphelp_hanaplafform/helpdata/en/93/b3e3191ae34508a4d92dff9b6d350c/content.htm.

* cited by examiner

*Primary Examiner* — Jau Shya Meng
(74) *Attorney, Agent, or Firm* — Fountainhead Law Group P.C.

(57) ABSTRACT

Embodiments include a method and system for supporting a common data processing definition across multiple data processing nodes in a data swamp comprising at least one local data storage system and one or more remote data storage systems including remote databases, cloud-based data storage, or one or more computational clusters. Users can create a document in a common data processing language (e.g., XML) that describes a set of data processing tasks and a set of data processing resources to perform the data processing tasks in a graphical interface. The interface can then generate the document and send it to remote agents located in close proximity to one or more of the data processing nodes to access the necessary data and processing resources to execute the processing tasks at the appropriate node where the data and resources are located without having to migrate the data for processing.

20 Claims, 10 Drawing Sheets

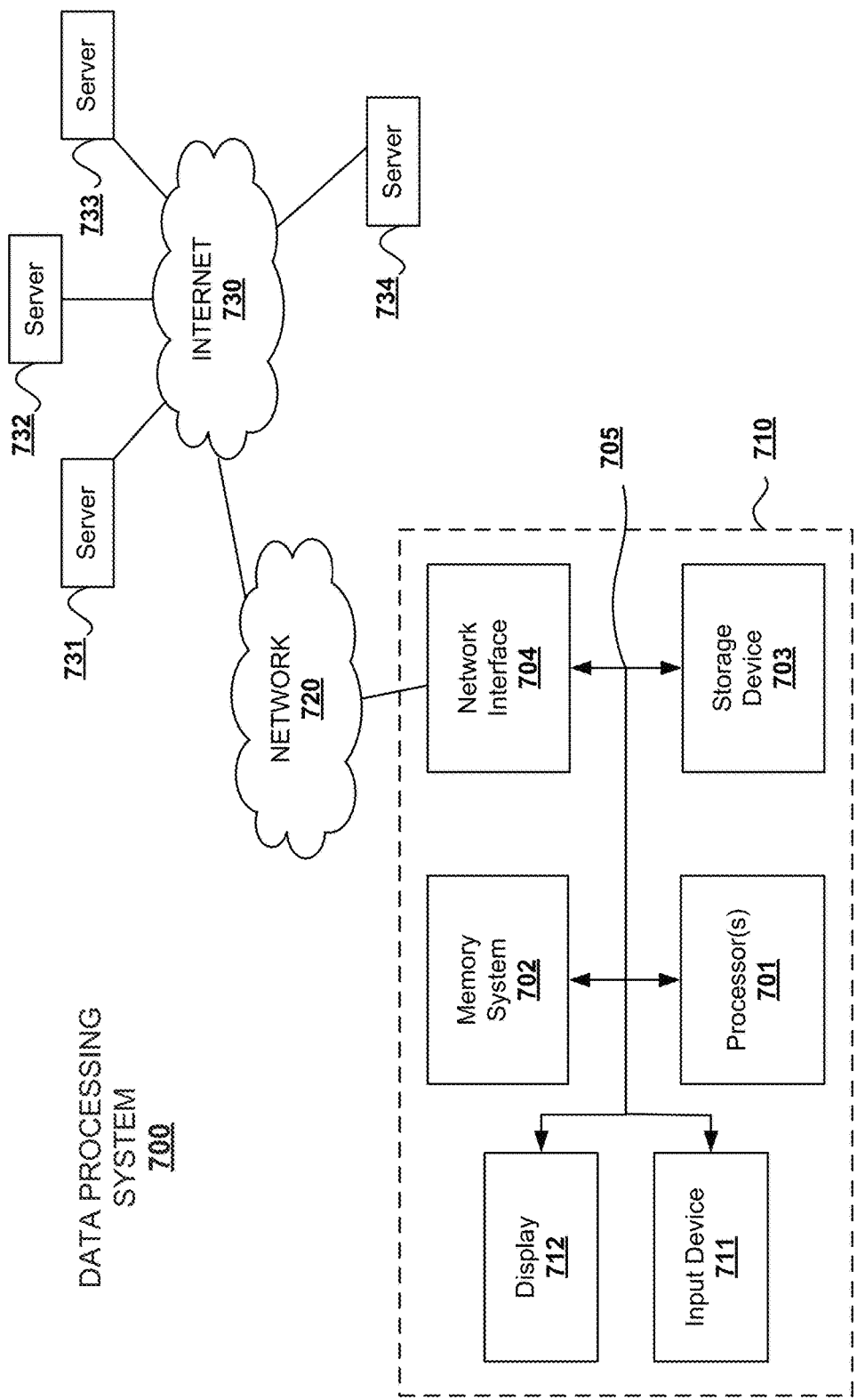

COMMON DATA PROCESSING DEFINITION ACROSS MULTIPLE DATA PROCESSING NODES

TECHNICAL FIELD

At least certain embodiments disclosed in this disclosure relate generally to data processing in data storage systems, and particularly to enabling a common data processing definition across multiple data processing nodes of a data swamp.

BACKGROUND

Many enterprises and organizations store and process big data in data storage devices, such as relational databases, examples of which include Oracle®, Sybase®, SAP HANA® databases. They also may have data residing in distributed data storage systems such as Amazon® and Google® cloud storage systems, or in computational clusters such as Hadoop®. These silos of disconnected data clusters are typically called data lakes or data swamps. Moreover, data can be structured or unstructured and can be from different domains such as financial, manufacturing, product master data, etc.

Businesses analyze data to derive business strategies and to make sound business decisions. Data needs to be correlated and combined across data nodes to form a more complete set of information. This incoming stream of data and continuous correlation of data allow analysts to monitor business activities and alter business plans when necessary.

Data can be curated, cleansed, and transformed (collectively referred to in this disclosure as "data processing") before it can be analyzed or used in a meaningful way. The most effective way is to process data in close proximity to where the data and corresponding data processing resources are stored. For instance, execution of data in relational databases is performed in the databases themselves with, for example, structured query language ("SQL") scripts. In this manner, data in distributed data storage system like Amazon's S3® and Google Cloud Storage® should be processed in Amazon's EC2® and Google's Cloud Computing Engine® respectively.

SUMMARY

The embodiments described in this disclosure include improved methods, systems and computer readable media for supporting a common data processing definition across multiple data processing nodes in a data swamp.

The following detailed description and accompanying drawings provide a better understanding of the nature and advantages of the present disclosure.

BRIEF DESCRIPTION OF THE DRAWINGS

For a better understanding of at least certain embodiments, reference will be made to the following detailed description, which is to be read in conjunction with the accompanying drawings.

FIG. 7 depicts an example overview block diagram of a data processing system upon which the embodiments described in the present disclosure may be implemented.

DETAILED DESCRIPTION

Throughout the description, for the purposes of explanation, numerous specific details are set forth in order to provide a thorough understanding of the present disclosure. It will be apparent to one skilled in the art, however, that the techniques described in this disclosure may be practiced without some of these specific details. In other instances, well-known structures and devices may be shown in block diagram form to avoid obscuring the principles and techniques described in this disclosure.

In at least certain embodiments, a system for supporting a common data processing definition across multiple data processing nodes in a data swamp is described. As used in this present disclosure the term "data swamp" refers generally to a data processing system comprising multiple data processing nodes including at least one local data storage device or system in communication with one or more remote data storage devices or systems over one or more communication networks. The remote data storage systems may include, for example, relational database systems, remote database systems, cloud-based data storage systems, and data storage systems within one or more computational clusters.

Figure 1:
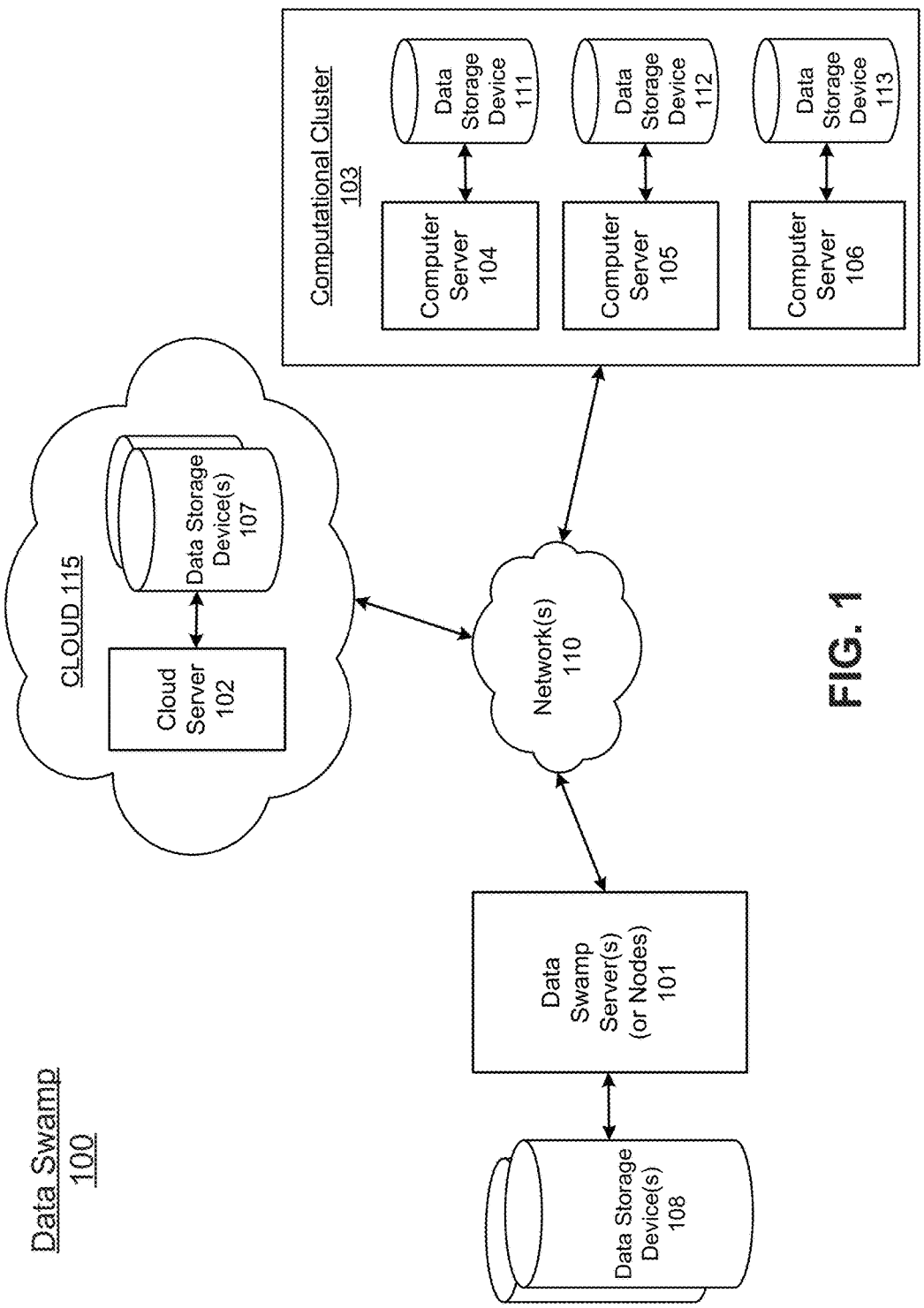
FIG. 1 depicts a conceptual block diagram of an example embodiment of a computing server in communication with a data swamp in accordance with the techniques described in this disclosure.

FIG. 1 depicts a conceptual block diagram of an example embodiment of a computing server in communication with a data swamp in accordance with the techniques described in this disclosure. In the illustrated embodiment, data swamp 100 includes a data swamp server 101 that is configured to communicate with a local data storage system (e.g., data storage device(s) 108) and a plurality of remote data storage systems over one or more networks 110. In one embodiment, the data swamp server(s) 101 may comprise an individual computing server or node, and in other embodiments, the data swamp server(s) or node(s) 101 may comprise a set of servers or other computing devices working together in a functionally coordinated manner.

In this example, the remote data storage systems include a cloud data storage system 115 comprising a cloud server 102 and its associated data storage device(s) 107 and a computational cluster 103 comprising database servers 104-106 and corresponding data storage devices 111-113. The data storage devices as described herein may include various databases including relational database systems, or other structured, semi-structured, or unstructured databases or data stores. In addition, the one or more networks 110 may include any type of network configured for electronic communications across the multiple remote data processing nodes.

The common data processing definition may be described using a common data processing definition language in a document. The common data processing definition language may describe a set of data processing tasks and a set of data processing resources for performing the set of data processing tasks regardless of where the data is physically stored. In one embodiment, this avoids the need to have different definitions for different data processing nodes. In one embodiment, the techniques described in this disclosure are configured to maintain a single copy of the common data processing definition for data stored in a distributed data storage system of multiple different data domains. This common data processing definition may be reused effectively once it is configured.

In one embodiment, the common data processing definition language comprises a well-formed eXtended Markup Language ("XML") document that describes the set of data processing tasks and resources for performing the tasks. This XML document may be communicated with one or more remote agent systems associated with the various different data processing nodes of the data swamp in order to process the data at the corresponding data processing node instead of processing the data at the data processing node where the XML document is generated.

I. Exemplary Systems

Provided below is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks.

Figure 2:
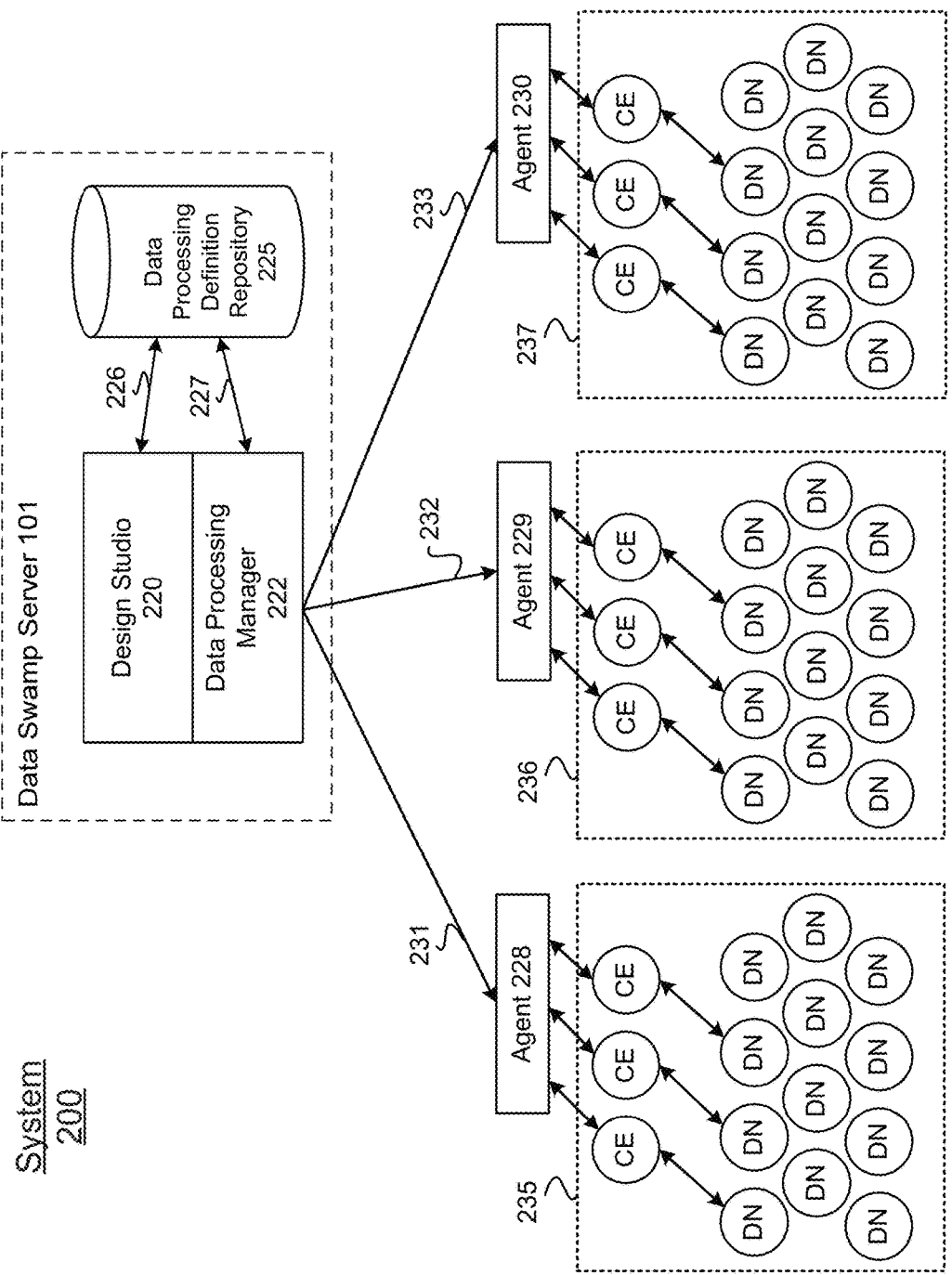
FIG. 2 depicts a conceptual block diagram of an example embodiment of a system for supporting a common data processing definition across multiple data processing nodes in accordance with the techniques described in this disclosure.

FIG. 2 depicts a conceptual block diagram of an example embodiment of a system for supporting a common data processing definition across multiple data processing nodes in accordance with the techniques described in this disclosure. In the illustrated embodiment, system 200 includes a data swamp server 101 in communication with a plurality of remote agent systems 228-230 via communication networks or mediums 231-233. The data swamp server 101 comprises a design studio 220, a data processing manager 222, and a data processing definition repository 225. As shown, the data processing definition repository 225 is in communication with the design studio 220 via one or more communication networks or mediums 226 and is in communication with the data processing manager 222 via one or more communication networks or mediums 227.

In this example, the remote agent systems 228-230 are associated with corresponding data processing nodes 235-237. The data processing nodes 235-237 include a plurality of computing engines (CE) and a plurality of data nodes (DN) (e.g., data storage devices). The computing engines (CE) may be configured to retrieve data from the data nodes (DN), process the data, and return the results of the data processing to the agent systems 228-230. The agents 228-230 may then provide the results of the data processing to the data swamp server 101.

In one embodiment, the computing engines (CEs) are where the data processing tasks can be executed and the data nodes (DN) are where the data to be processed can be stored. It should be noted that in one embodiment the data processing nodes 235-237 may comprise only a single computing engine (CE) and may also comprise only a single data node (DN). The techniques described in this present disclosure are not limited to any particular number of computing engines or data nodes.

In one example embodiment, the design studio 220 and data processing manager 222 may be provided in an application running on the data swamp server 101. The design studio 220 may comprise a graphical interface that provides graphical information and enables users to design the common data processing definition document (e.g., XML document) in the common data processing definition language. The data processing manager 222 may comprise a registrar of agent systems.

The data processing definition repository 225 may be a data storage device or data storage system configured to store the common data processing definition documents designed by users in a graphical interface of the design studio 220. The design studio 220 may generate the common data processing definition document based on the graphical designs provided by users. The common data processing definition documents may then be provided to the data processing manager 222 for performing the set of data processing tasks outlined in the documents.

The data processing manager 222 may communicate the common data processing definition documents to one or more of the agent systems 228-230 associated with one or more of the data processing nodes 235-237. The agents 228-230 may comprise computer software that is located in close proximity to the computing engines of the data nodes 235-237. The agent systems 228-230 may also be implemented in computer hardware, or a combination of computer hardware and software.

In one embodiment, the agent systems 228-230 are located in close proximity to the data processing nodes 235-237 in order to efficiently and effectively process the data (e.g., curate, cleanse, and/or transform) at a location that is close to where the data actually resides so that data movement from the data nodes (DN) to other remote computer elements of other data processing nodes is avoided. For instance, execution of data in relational databases should preferably occur in the databases themselves with SQL scripts. Likewise, data stored in distributed storage system like Amazon's S3® and Google Cloud Storage® should be processed in Amazon's EC2® and Google's Cloud Computing Engine® respectively. The common data processing definition can therefore be configured to describe the set of data processing tasks and the set of data processing resources to perform the tasks regardless of where the data is actually stored. This avoids the need to have different definitions for different data processing nodes. In one embodiment, the data processing nodes 235-237 may be different data processing nodes of different data domains.

Figure 3A:
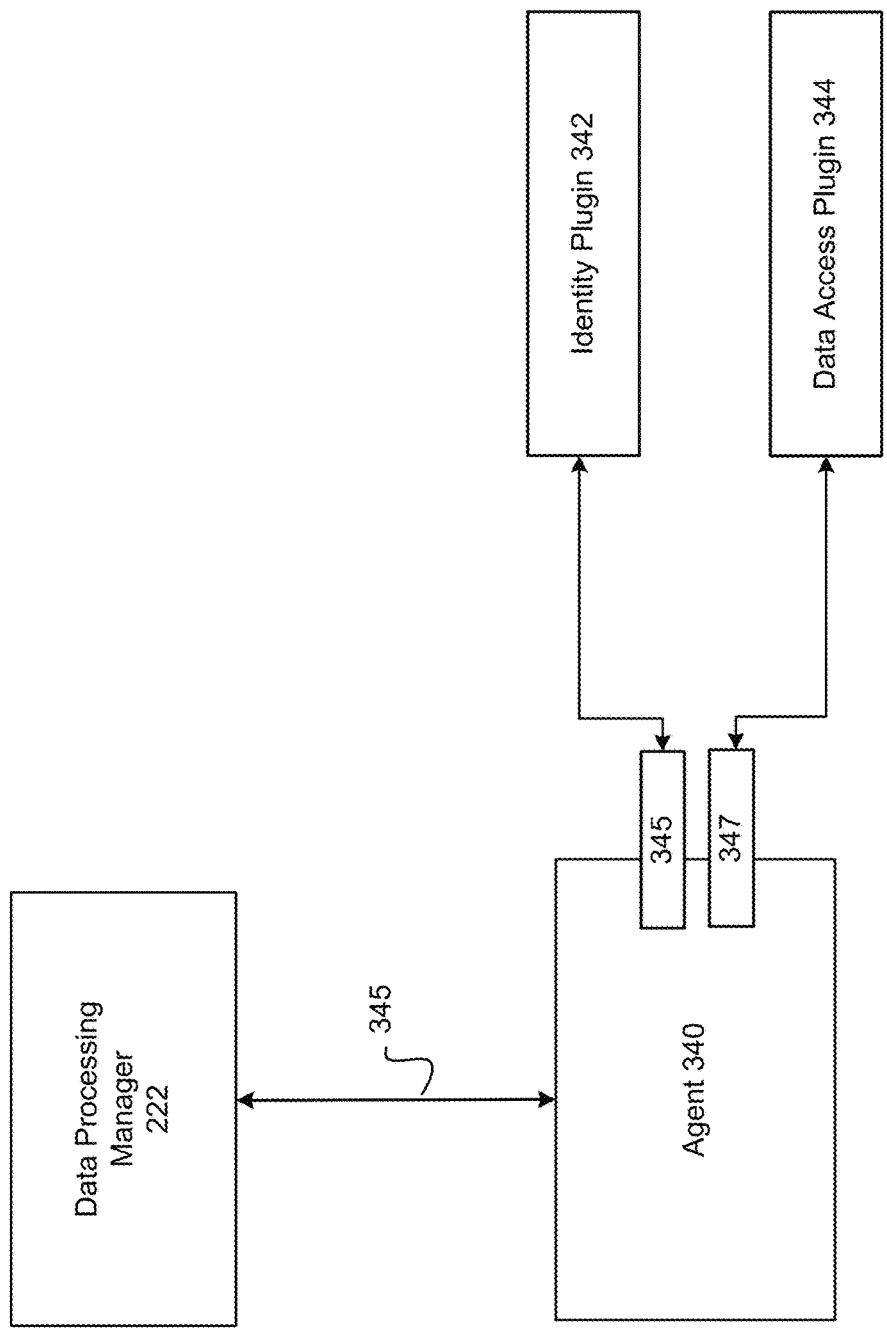
FIGS. 3A-3C depict conceptual block diagrams of example embodiments of a system for supporting a common data processing definition across multiple data processing nodes in accordance with the techniques described in this disclosure.
Figure 3B:
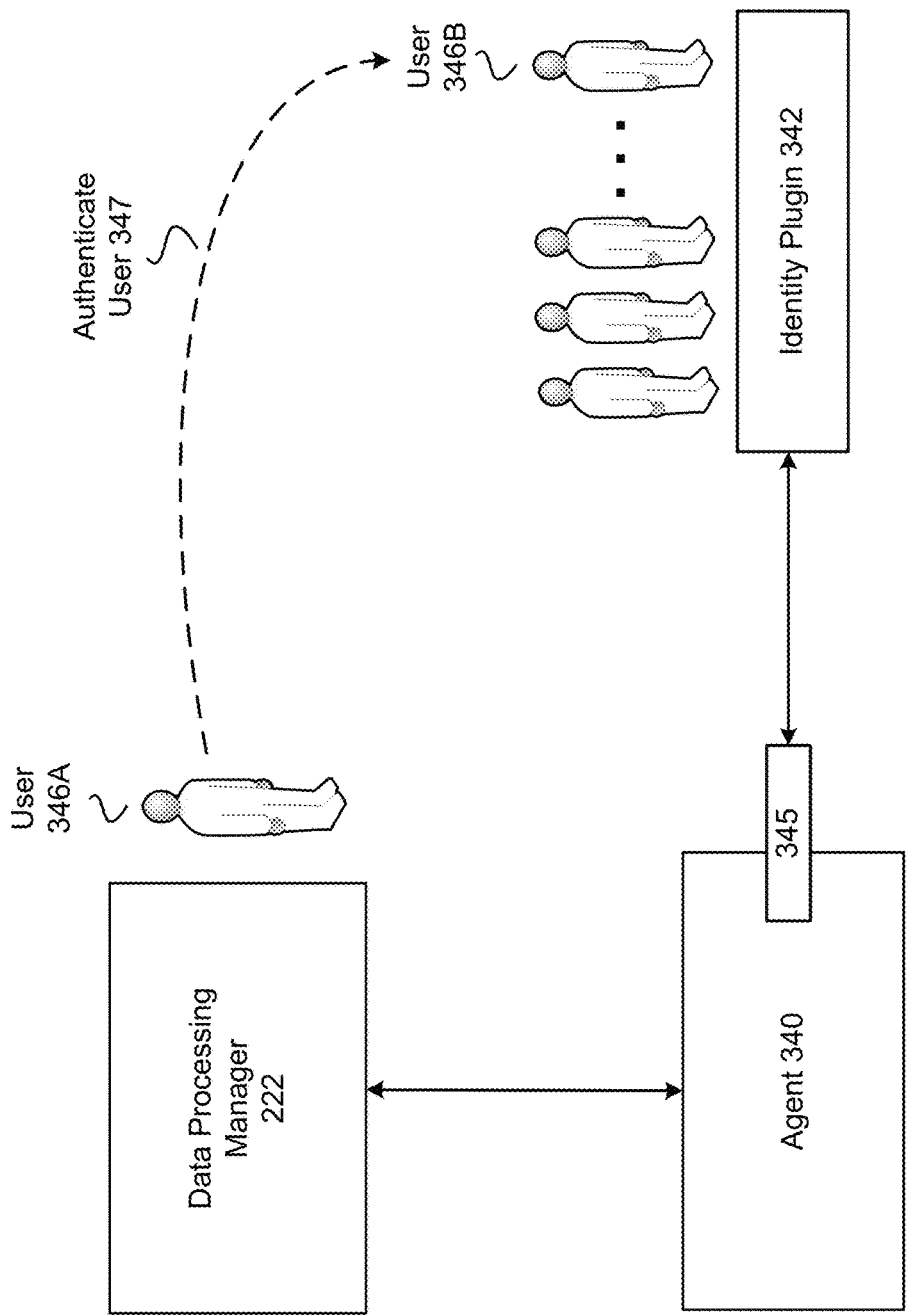
Figure 3C:
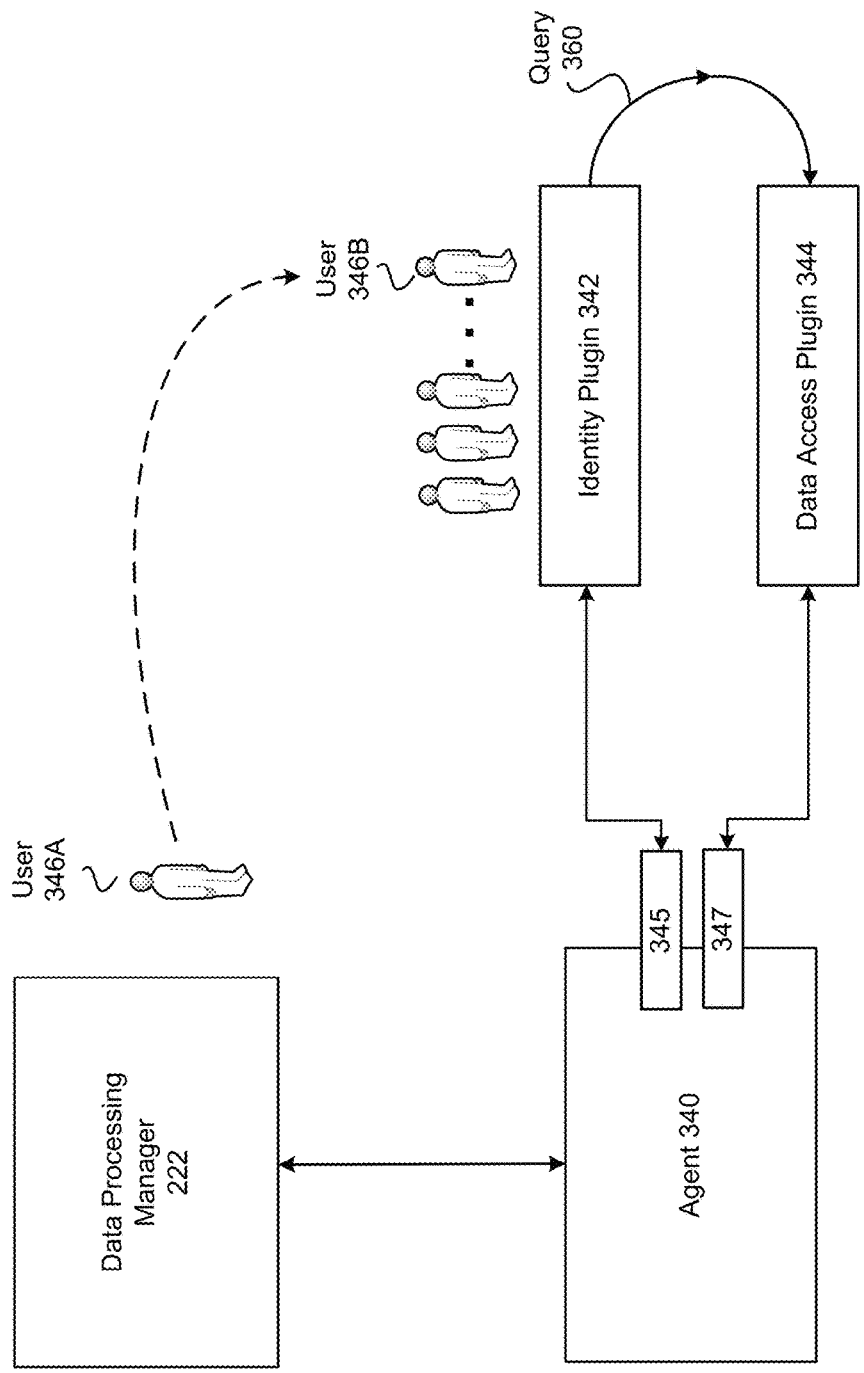

FIGS. 3A-3C depict conceptual block diagrams of example embodiments of a system for supporting a common data processing definition across multiple data processing nodes in accordance with the techniques described in this disclosure. The illustrated embodiment of FIG. 3A includes the data processing manager 222 and an agent system 340 in communication with the data processing manager 222 via one or more communication networks or mediums 345. As discussed above, the agent 340 may be deployed near the computing engines and data nodes of the multiple data processing nodes in a data swamp.

In this example, the agent 340 comprises two interfaces including the identity interface 345 and data access interface 347. In one embodiment, the identity interface 345 can be configured to handle user identity authentication and/or verification via identity plug-in 342 and the data access interface 347 can be configured to provide queries (e.g., SQL queries) for access to the granted resources associated with an identity subject via the data access plug-in 344. The agent 340 can be configured to register itself with the data processing manager 222. In one embodiment, the application user can be associated with a user account (referred to as the "identity subject") in the agent system 340's domain. Once the association is completed, the accounts of a user of the data processing manager 222 can be linked with one or more user accounts of the agent system 340. The account linking information can then be stored in the data processing manager 222 and the agent system 340.

Account information of the user 346A of the data processing manager 222 can be linked with one or more user accounts associated with the remote data processing node associated with the agent 340. In FIG. 3B, the user 346A is associated with a user 346B of a plurality of users of the agent system 340. This association may be provided by the identity plug-in 342 via identity interface 345. This can enable the user 346B at the agent system 342 to process data processing requests at the remote data processing node associated with agent 340 on behalf of the user 346 at the data processing manager 222 based on the linked account information. That is, user 346A associated with the data processing manager 222 can "stand in the shoes" of user 346B at the agent 340 to process the data processing tasks at the data processing node associated with the agent 340.

The account information of the users 346A and 346B, as well as the linked account information, can be stored at the design processing manager 222 and the agent system 340. In the depicted embodiment, the user 346A can be authenticated on the data processing node associated with agent 340 via authentication and/or verification across communication networks or mediums 347. The user 346A can log into the application on the data swamp server 101 and establish a connection with the agent 340. The user 346A can provide access credentials including the user 346A's username and password for corresponding user 346B on agent system 340. The user 346A can then access whatever data processing resources (e.g., data, folders, files, directories, software, etc.) that the user 346B has access to on the agent side.

As shown in the illustrated embodiment of FIG. 3C, the user 346A can communicate queries 360 to access the data processing resources from the data access plugin 344 that are available to the user 346B on the agent system 340. The data processing manager 222 communicates data processing requests to the agent 340 on behalf of the application user 346A. Once the request reaches the agent 340, the application user 346A can be mapped to the user 346B in agent system 340's domain. Agent 340 can then use the mapped user 346B to query the data for user 346A for the granted resources available to user 346B.

Figure 4:
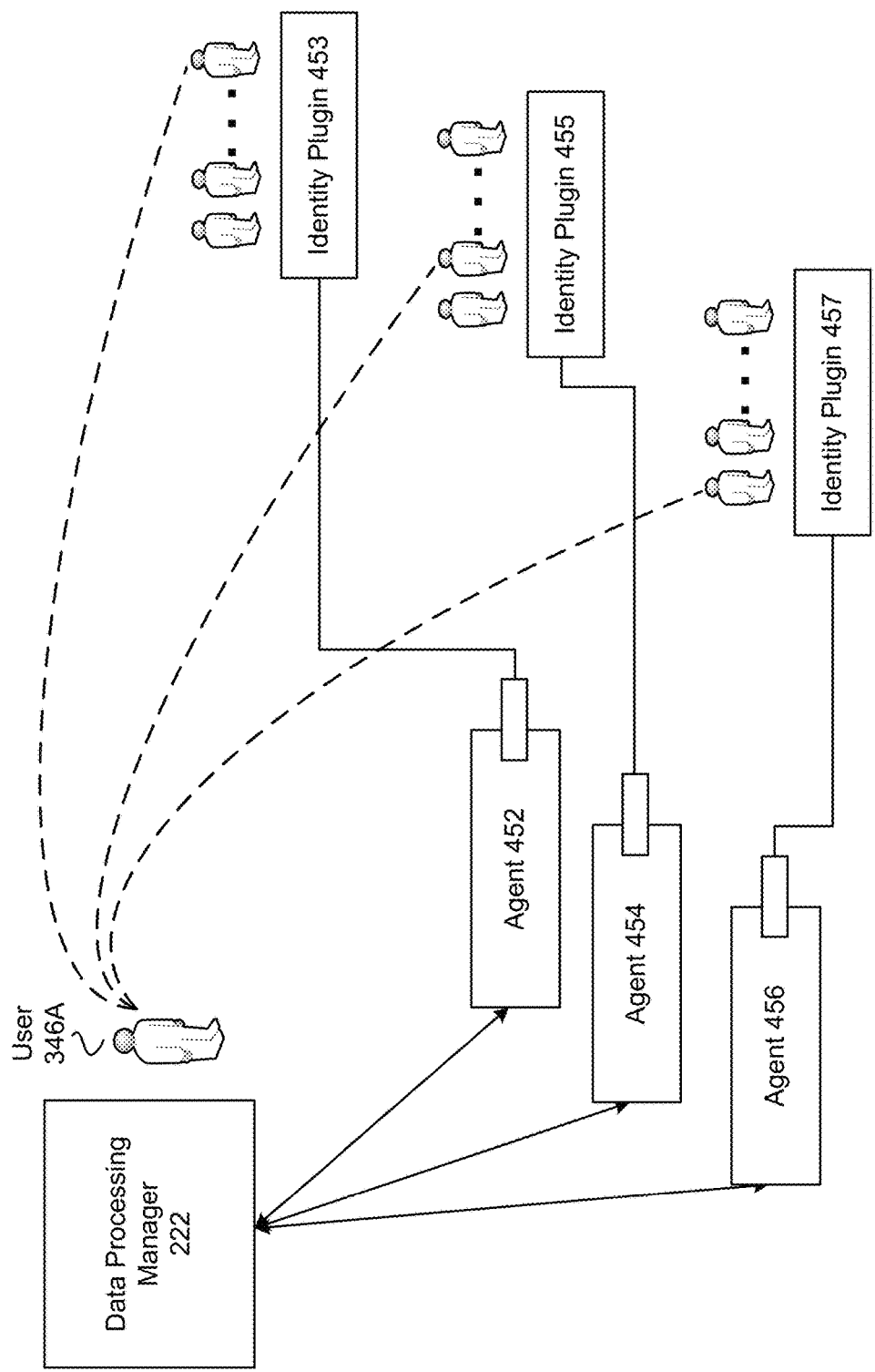
FIG. 4 depicts a conceptual block diagram of an example embodiment of a system for supporting a common data processing definition across multiple data processing nodes in accordance with the techniques described in this disclosure.

In this manner, an application user can be associated with many users in different agents as shown in FIG. 4. As shown in FIG. 4, user 346A of the data processing manager 222 can be mapped to multiple user accounts on the agent side. In this case, user 346A is linked with users on agent systems 452, 454, and 456, and has access via plugins 453, 455, and 457 corresponding to those agent system. Application users therefore have the ability to list and explore the data processing resources that are made available to them from different agents.

Figure 5:
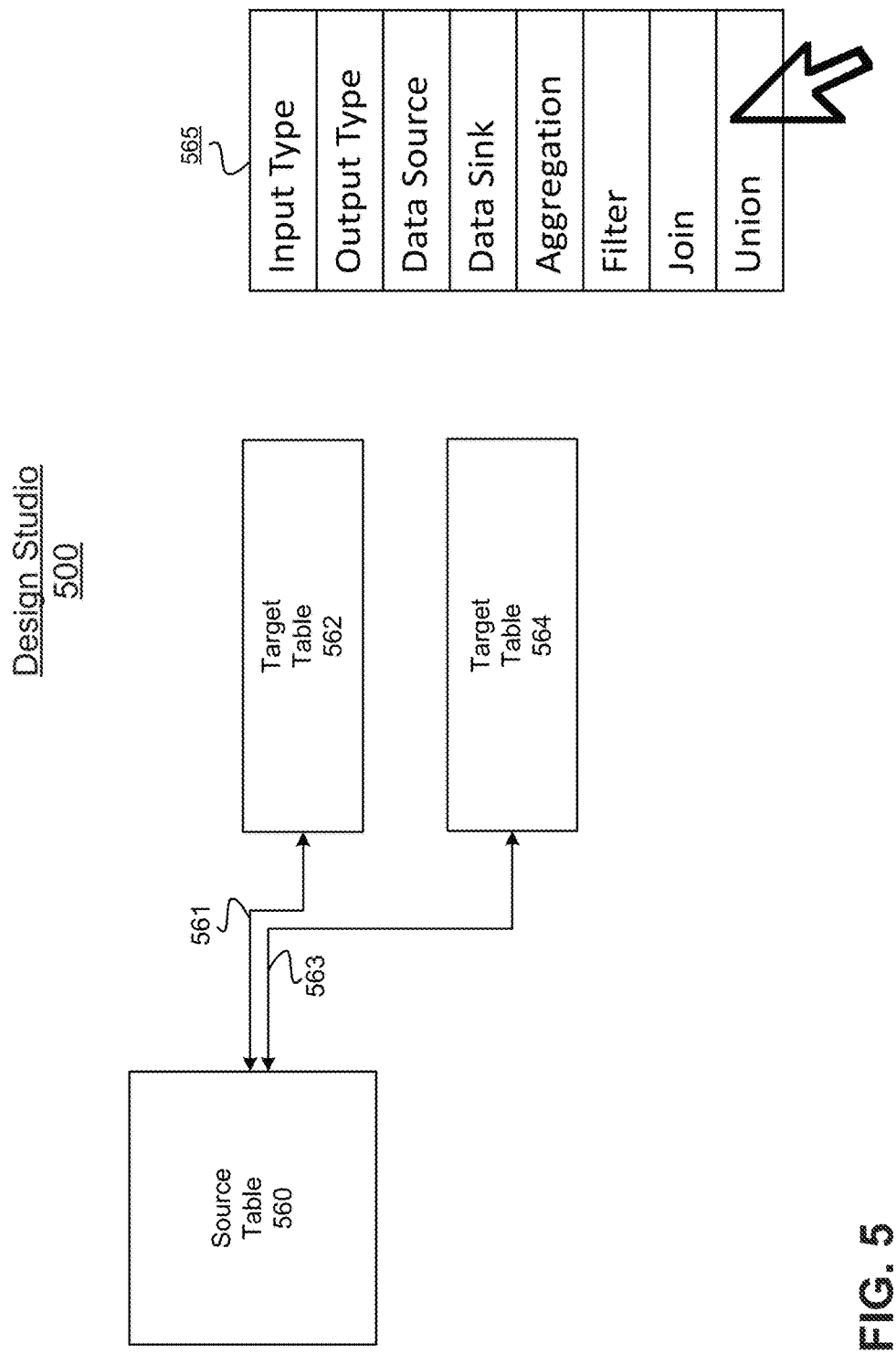
FIG. 5 depicts a conceptual block diagram of example embodiment of a graphical interface of a system for supporting a common data processing definition across multiple data processing nodes in accordance with the techniques described in this disclosure.

FIG. 5 depicts a conceptual block diagram of example embodiment of a graphical interface of a system for supporting a common data processing definition across multiple data processing nodes in accordance with the techniques described in this disclosure. In the illustrated embodiment, design studio 500 provides users with the ability to visually configure a common data processing definition document. The document can then be generated in the common data processing definition language (e.g., XML) that is output from the design studio 500 interface.

As shown, in the graphical interface of design studio 500 users can configure various source tables 560 and target tables 562 and 564 from one or more of the data processing nodes within the data swamp, as well as select from a number of tasks 561/563 to be performed on those tables from a menu of task functions 565. In the depicted example embodiment, the options available in menu 565 include input type, output type, data source, data sink, aggregations, filters, and join and union operations between the selected data tables. The design studio 500 can then take the user's graphical design and output a common data processing definition document to be used by the data processing manager 222 for performing a set of tasks on those selected data processing resources.

The common data processing definition documents can be used to transform source data from local or remote sources. Using the design studio 500, users can quickly and efficiently connect with and upload multiple data sets including relational data sets (Oracle, MS SQL Server, IBM DB2) or files, on premise, or in the cloud. The software will then help users discover and understand the data, and cleanse, enrich or combine the data.

Users can merge or join different data sets together. Advanced database join operations can also be performed as the user is guided through the process via intuitive screens with illustrations.

II. Exemplary Processes

The following figures depict example flow charts illustrating various embodiments of a process for mapping data in a database server in communication with a database system according to the techniques described in this disclosure. It is noted that the processes described below are exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations.

In addition, the operations may be embodied in computer-executable code, which causes a general-purpose or special-purpose computer to perform certain functional operations. In other instances, these operations may be performed by specific hardware components or hardwired circuitry, or by any combination of programmed computer components and custom hardware circuitry.

Figure 6A:
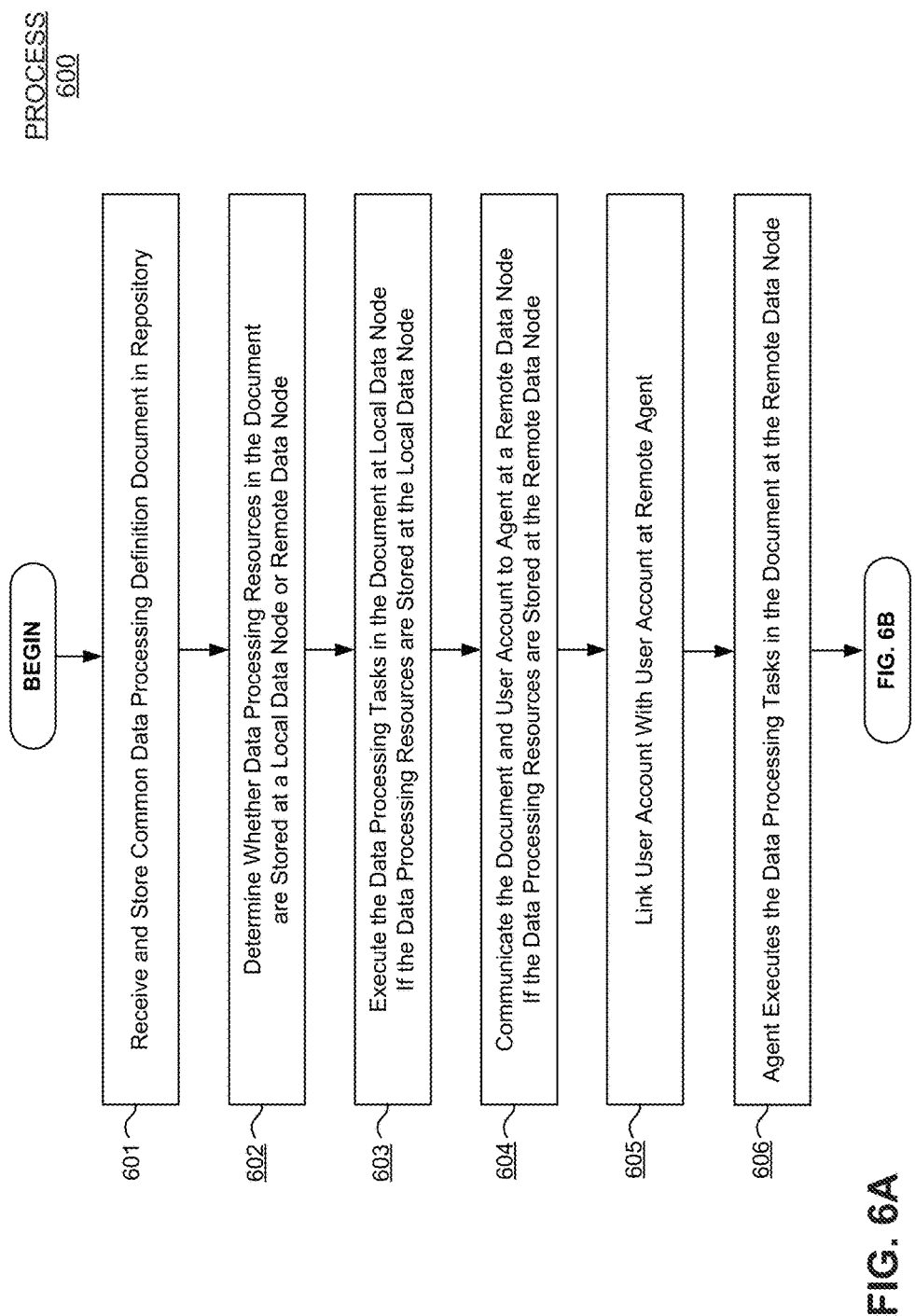
FIGS. 6A-6B depict flow charts of example embodiments of a process for supporting a common data processing definition across multiple data processing resources in a data swamp in accordance with the techniques described in this disclosure.
Figure 6B:
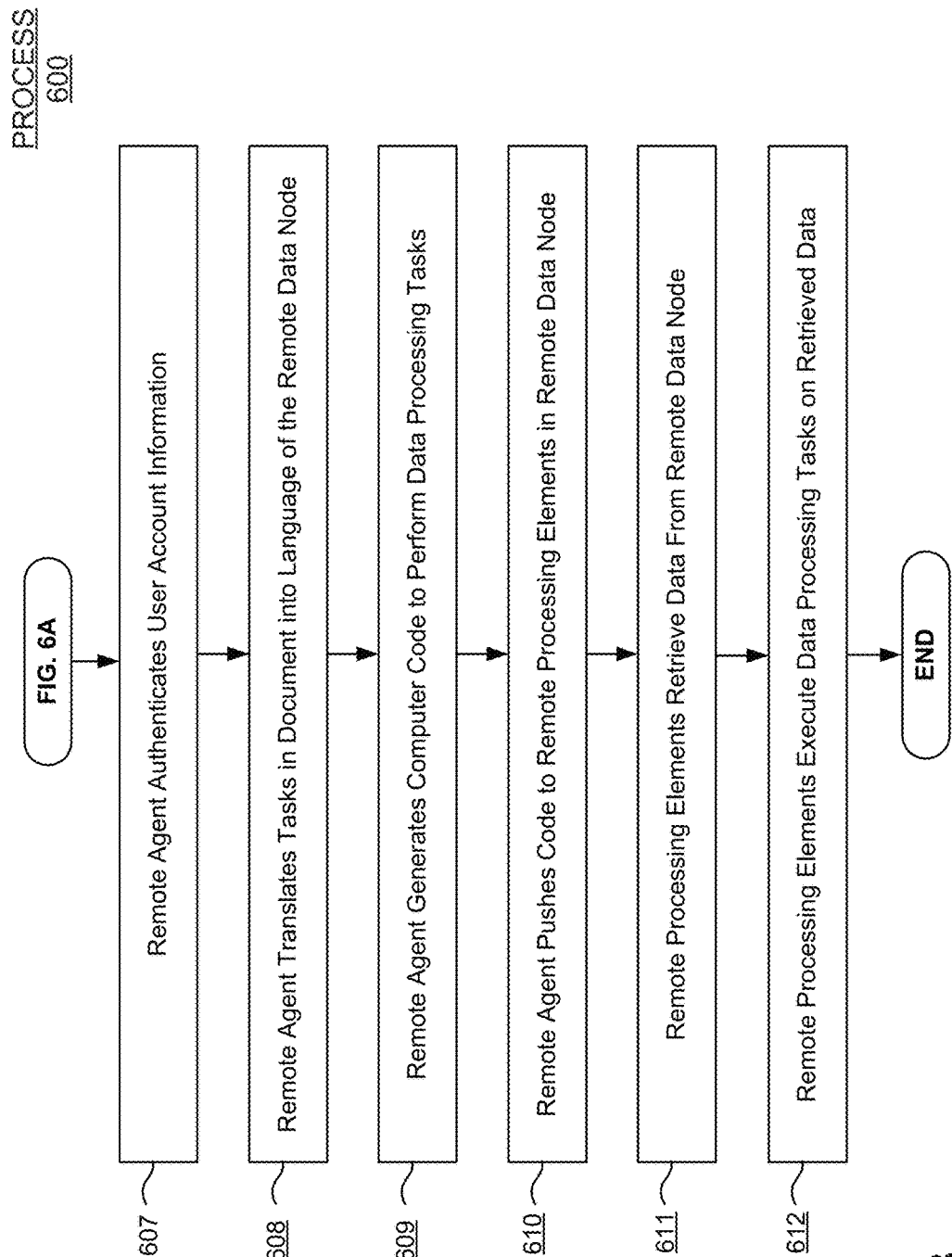

FIGS. 6A-6B depict flow charts of example embodiments of a process for supporting a common data processing definition across multiple data processing resources in a data swamp in accordance with the techniques described in this disclosure. In the illustrated embodiment of FIG. 6A, process 600 begins at operation 601 where the system is configured to receive a document in a common data processing definition language and store it in a data processing definition repository of a computer system. In one embodiment, the common data processing definition document describes a set of data processing tasks and a set of data processing resources to perform the data processing tasks.

Process 600 continues by determining whether the set of data processing resources are stored at one or more local data nodes or one or more remote data nodes (operation 602). In one embodiment, this can be performed by a data processing manager of the computer system. If the set of data processing resources are stored at the one or more local data nodes, process 600 can execute the data processing tasks using the data processing resources stored at the one or more local data nodes (operation 603). If the set of data processing resources are stored at the one or more remote data nodes, process 600 can communicate the document and account information of the user to one or more remote agent systems associated with the one or more remote data nodes (operation 604) and link the account information of the user with one or more corresponding user accounts of the one or more remote agent systems (operation 605). The remote agent can then cause the data processing tasks to be executed using the data processing resources stored at the one or more remote data nodes (operation 606).

Process 600 continues at FIG. 6B. In response to receiving the document and account information of the user at operation 607, the one or more remote agent systems can be configured to authenticate the account information of the user (operation 607), translate the set of data processing tasks in the document into a language compatible with the one or more remote data nodes (operation 608), generate computer code to perform the set of data processing tasks (operation 609), and push the computer code to one or more data processing elements at the one or more remote data nodes (operation 610). The one or more data processing elements can then retrieve data from the one or more remote data nodes (operation 611) and to execute the set of data processing tasks on the retrieved data (operation 612).

In one embodiment, the data swamp may comprise at least one local data storage system and one or more remote data storage systems including one or more of a database system, a cloud data storage system, and a computational cluster of data storage systems. The one or more remote agent systems can be located in close proximity to the one or more remote data nodes such that relocation of data for performing the data processing tasks is avoided. The common data processing definition language describes the set of data processing tasks regardless of where data to be processed is stored.

The account linking information can be stored at the data processing manager and the one or more remote agent systems. The account information of the user can be associated with a plurality of different user accounts of a plurality of different remote agent systems. The one or more remote agent systems may include an identity interface to handle user account authentication and a data access interface to query for data processing resources from the one or more remote data nodes granted to the user accounts.

As discussed above, the set of data processing tasks and the set of data processing resources in the document can be defined by the user in a graphical interface of the design studio configured for graphically designing the document. The one or more remote agent systems can be registered with the data processing manager of the computer system.

This completes process 600 in accordance with one example embodiment.

III. Exemplary Hardware Implementation

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks.

FIG. 7 depicts an example overview block diagram of a data processing system upon which the embodiments described in this disclosure may be implemented. It is to be understood that a variety of computers configurations may be used to implement the described techniques. While FIG. 7 illustrates various components of a data processing system 700, it is not intended to represent any particular architecture or manner of interconnecting components. It will also be appreciated that network computers and other data processing systems, which have fewer components or additional components, may be used. The data processing system 700 may, for example, comprise a personal computer (PC), workstation, laptop computer, tablet, smartphone or other hand-held wireless device, or any device having similar functionality.

In the illustrated embodiment, data processing system 700 includes a computer system 710. Computer system 710 includes an interconnect bus 705 (or other communication mechanism for communicating information) and one or more processor(s) 701 coupled with the interconnect bus 705 for processing information. Computer system 710 also includes a memory system 702 coupled with the one or more processors 701 via the interconnect bus 705. Memory system 702 is configured to store information and instructions to be executed by processor 701, including information and instructions for performing the techniques described above. This memory system may also be used for storing programs executed by processor(s) 701. Possible implementations of this memory system may be, but are not limited to, random access memory (RAM), read only memory (ROM), or combination thereof.

In the illustrated embodiment, a storage device 703 is also provided for storing information and instructions. Typically storage device 703 comprises nonvolatile memory. Common forms of storage devices include, for example, a hard drive, a magnetic disk, an optical disk, a CD-ROM, a DVD, a flash or other non-volatile memory, a USB memory card, or any other computer-readable medium from which a computer can read data and instructions. Storage device 703 may store source code, binary code, or software files for performing the techniques above. In addition, while FIG. 7 shows that storage device 703 as a local device connected with the components of the data processing system, it will be appreciated by skilled artisans that the described techniques may use a storage device remote from the system, such as a database or other network storage device coupled with the computer system 710 through a network interface such as network interface 704.

Network interface 704 may provide communications between computer system 710 and a network 720. The network interface 704 may be a wireless or wired connection, or any combination thereof. Computer system 710 is configured to send and receive information through the network interface 704 across one or more networks 720 such as a local area network (LAN), wide-area network (WAN), wireless or Bluetooth network, or the Internet 730, etc. Computer system 710 may access data and features on systems residing on one or multiple different hardware servers 731-734 across the network 720. Hardware servers 731-734 and associated server software may also reside in a cloud computing environment.

Storage device and memory system are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including floppy disks, hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a network-coupled computer system stored and executed in a distributed fashion.

Further, computer system 710 may be coupled via interconnect bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized interconnect buses.

With these embodiments in mind, it will be apparent from this description that aspects of the described techniques may be embodied, at least in part, in software, hardware, firmware, or any combination thereof. It should also be understood that embodiments can employ various computer-implemented functions involving data stored in a computer system. The techniques may be carried out in a computer system or other data processing system in response executing sequences of instructions stored in memory.

Throughout the foregoing description, for the purposes of explanation, numerous specific details were set forth in order to provide a thorough understanding of the disclosure. It will be apparent, however, to persons skilled in the art that these embodiments may be practiced without some of these specific details. The above examples and embodiments should not be deemed to be the only embodiments, and are presented to illustrate the flexibility and advantages of the present disclosure. Other arrangements, embodiments, implementations and equivalents will be evident to those skilled in the art and may be employed without departing from the spirit and scope of the disclosure as defined by the following claims.

What is claimed is:

1. A method for supporting a common data processing definition across multiple data processing nodes in a data swamp, the method comprising:
   storing, in a data processing definition repository of a computer system, a document in a common data processing definition language that describes a set of data processing tasks and a set of data processing resources to perform the data processing tasks;
   determining, by a data processing manager of the computer system, whether the set of data processing resources are stored at one or more local data nodes or one or more remote data nodes;
   if the set of data processing resources are stored at the one or more local data nodes:
   retrieving the data processing resources from the one or more local data nodes; and
   causing the data processing tasks to be executed using the data processing resources stored at the one or more local data nodes; and
   if the set of data processing resources are stored at the one or more remote data nodes:
   communicating the document and account information of a user to one or more remote agent systems associated with the one or more remote data nodes; and
   linking the account information of the user with one or more corresponding user accounts of the one or more remote agent systems,
   wherein the one or more remote agent systems are configured to cause the data processing tasks to be executed using the data processing resources stored at the one or more remote data nodes.

2. The method of claim 1 wherein in response to receiving the document and account information of the user, the one or more remote agent systems are configured to:
   authenticate the account information of the user;
   translate the set of data processing tasks in the document into a language compatible with the one or more remote data nodes to generate computer code to perform the set of data processing tasks; and
   push the computer code to one or more data processing elements at the one or more remote data nodes,
   wherein the one or more data processing elements are configured to retrieve data from the one or more remote data nodes and to execute the set of data processing tasks on the retrieved data.

3. The method of claim 1 wherein the data swamp comprises at least one local data storage system and one or more remote data storage systems including one or more of a database system, a cloud data storage system, and a computational cluster of data storage systems.

4. The method of claim 1 wherein the one or more remote agent systems are located in close proximity to the one or more remote data nodes, and wherein relocation of data for performing the data processing tasks is avoided.

5. The method of claim 1 wherein the common data processing definition language describes the set of data processing tasks regardless of where data to be processed is stored.

6. The method of claim 1 further comprising storing account linking information at the data processing manager and the one or more remote agent systems.

7. The method of claim 1 wherein the account information of the user is associated with a plurality of different user accounts of a plurality of different remote agent systems.

8. The method of claim 1 wherein the one or more remote agent systems comprise:
an identity interface to handle user account authentication; and
a data access interface to query for data processing resources from the one or more remote data nodes granted to the user accounts.

9. The method of claim 1 wherein the set of data processing tasks and the set of data processing resources in the document are defined by the user in an interface configured for graphically designing the document.

10. The method of claim 1 wherein the one or more remote agent systems are registered with the data processing manager of the computer system.

11. A system comprising:
a data swamp comprising a plurality of data nodes of different data domains;
a plurality of remote agent systems associated with the plurality of data nodes;
a computing device in communication with the plurality of remote agent systems, the computing system comprising at least one processor and a memory adapted to store computer programs, which when executed by the processor, cause the processor to perform operations comprising:
storing, in a data processing definition repository of a computer device, a document in a common data processing definition language that describes a set of data processing tasks and a set of data processing resources to perform the data processing tasks;
determining, by a data processing manager of the computer device, whether the set of data processing resources are stored at one or more local data nodes or one or more remote data nodes;
if the set of data processing resources are stored at the one or more local data nodes:
retrieving the data processing resources from the one or more local data nodes; and
causing the data processing tasks to be executed using the data processing resources stored at the one or more local data nodes; and
if the set of data processing resources are stored at the one or more remote data nodes:
communicating the document and account information of a user to one or more remote agent systems associated with the one or more remote data nodes; and
linking the account information of the user with one or more corresponding user accounts of the one or more remote agent systems,
wherein the one or more remote agent systems are configured to cause the data processing tasks to be executed using the data processing resources stored at the one or more remote data nodes.

12. The system of claim 11 wherein in response to receiving the document and account information of the user, the one or more remote agent systems are configured to:
authenticate the account information of the user;
translate the set of data processing tasks in the document into a language compatible with the one or more remote data nodes to generate computer code to perform the set of data processing tasks; and
push the computer code to one or more data processing elements at the one or more remote data nodes,
wherein the one or more data processing elements are configured to retrieve data from the one or more remote data nodes and to execute the set of data processing tasks on the retrieved data.

13. The system of claim 11 wherein the data swamp comprises at least one local data storage system and one or more remote data storage systems including one or more of a database system, a cloud data storage system, and a computational cluster of data storage systems.

14. The system of claim 11 wherein the one or more remote agent systems are located in close proximity to the one or more remote data nodes, and wherein relocation of data for performing the data processing tasks is avoided.

15. The system of claim 11 wherein the one or more remote agent systems comprise:
an identity interface to handle user account authentication; and
a data access interface to query for data processing resources from the one or more remote data nodes granted to the user accounts.

16. The system of claim 11 wherein the set of data processing tasks and the set of data processing resources in the document are defined by the user in an interface configured for graphically designing the document.

17. A non-transitory computer readable medium storing programmed computer code, which when executed by at least one processor, causes the processor to perform operations for supporting a common data processing definition across multiple data processing nodes in a data swamp, the operations comprising:
storing, in a data processing definition repository of a computer system, a document in a common data processing definition language that describes a set of data processing tasks and a set of data processing resources to perform the data processing tasks;
determining, by a data processing manager of the computer system, whether the set of data processing resources are stored at one or more local data nodes or one or more remote data nodes;
if the set of data processing resources are stored at the one or more local data nodes:
retrieving the data processing resources from the one or more local data nodes; and
causing the data processing tasks to be executed using the data processing resources stored at the one or more local data nodes; and
if the set of data processing resources are stored at the one or more remote data nodes:
communicating the document and account information of a user to one or more remote agent systems associated with the one or more remote data nodes; and
linking the account information of the user with one or more corresponding user accounts of the one or more remote agent systems,
wherein the one or more remote agent systems are configured to cause the data processing tasks to be executed using the data processing resources stored at the one or more remote data nodes.

18. The non-transitory computer readable medium of claim 17 wherein in response to receiving the document and account information of the user, the one or more remote agent systems are configured to:
   authenticate the account information of the user;
   translate the set of data processing tasks in the document into a language compatible with the one or more remote data nodes to generate computer code to perform the set of data processing tasks; and
   push the computer code to one or more data processing elements at the one or more remote data nodes,
   wherein the one or more data processing elements are configured to retrieve data from the one or more remote data nodes and to execute the set of data processing tasks on the retrieved data.

19. The non-transitory computer readable medium of claim 17 wherein the data swamp comprises at least one local data storage system and one or more remote data storage systems including one or more of a database system, a cloud data storage system, and a computational cluster of data storage systems.

20. The non-transitory computer readable medium of claim 17 wherein the one or more remote agent systems are located in close proximity to the one or more remote data nodes, and wherein relocation of data for performing the data processing tasks is avoided.

* * * * *